(12) United States Patent
Kitagawa

(10) Patent No.: US 6,625,395 B2
(45) Date of Patent: Sep. 23, 2003

(54) OPTICAL PRINTER FOR EXPOSING AN INSTANT FILM

(75) Inventor: Kiichiro Kitagawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/011,483

(22) Filed: Dec. 11, 2001

(65) Prior Publication Data
US 2002/0071668 A1 Jun. 13, 2002

(30) Foreign Application Priority Data
Dec. 11, 2000 (JP) .................................. 2000-376115

(51) Int. Cl.[7] ............................................... G03B 17/50
(52) U.S. Cl. ........................................... 396/33; 396/40
(58) Field of Search ................................ 396/30, 32, 33, 396/40, 42, 527, 583

(56) References Cited

FOREIGN PATENT DOCUMENTS

| JP | 11-249239 | * | 9/1999 |
| JP | 11-34472 | | 12/1999 |
| JP | 11-352595 | | 12/1999 |
| JP | 2001-13658 | * | 1/2002 |

OTHER PUBLICATIONS

Japanese Patent Abstract 11–34472.
Japanese Patent Abstract 11–352595.

* cited by examiner

Primary Examiner—Della J. Rutledge
(74) Attorney, Agent, or Firm—Sughrue Mion, PLLC

(57) ABSTRACT

In a digital instant camera, a fixed exposure head emits a printing light to an instant film contained in a film pack, and a spreading roller performs a developing process. While the instant film is conveyed by the spreading roller toward the outside of the camera, the exposure head emits the printing light in synchronism with the conveyance of the instant film. A conveyance speed of the instant film is suddenly increased at the moment that a developer pod provided on the instant film is broken by the spreading roller. A brake roller, however, prevents the conveyance speed from suddenly increasing. In virtue of the brake roller, the printing light may be surely emitted to the instant film.

12 Claims, 7 Drawing Sheets

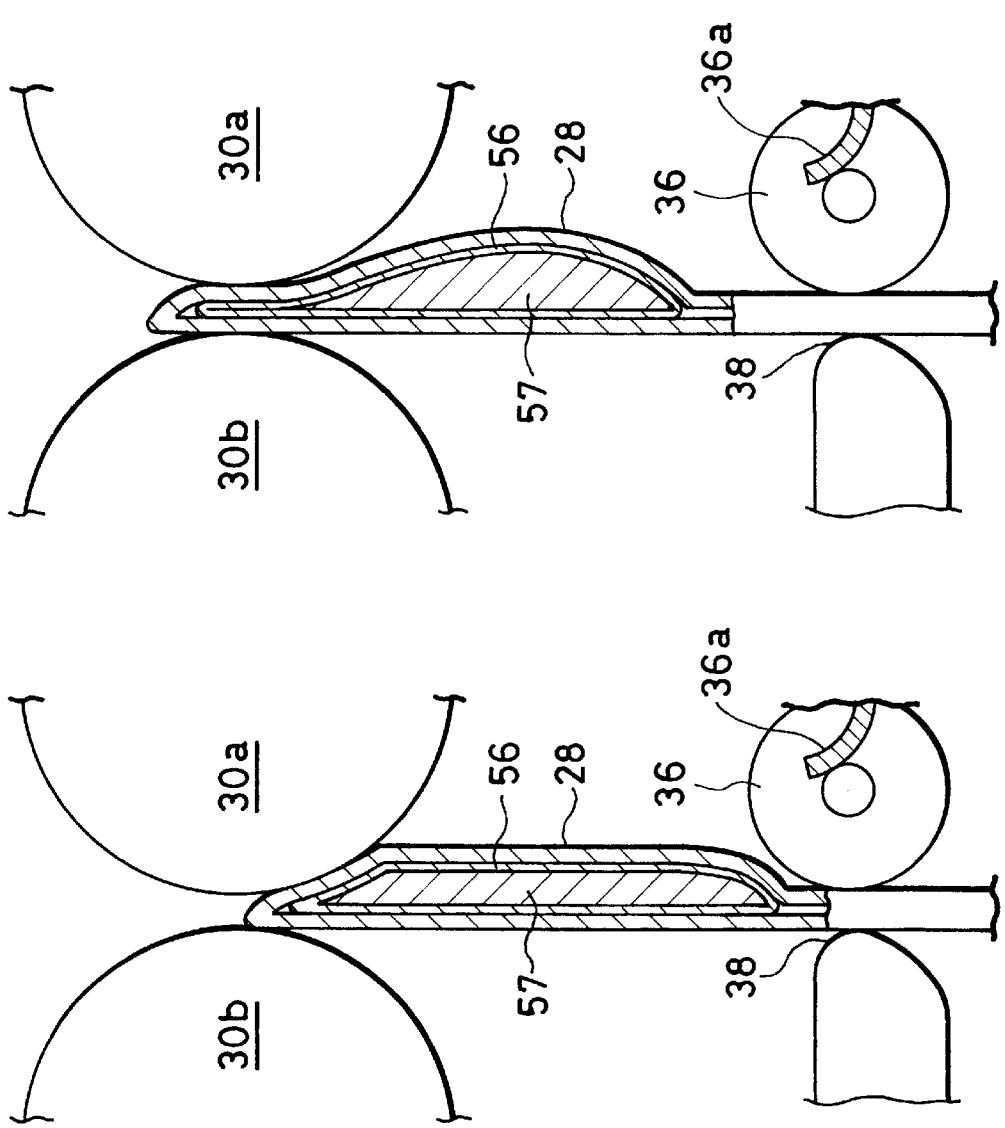

OPTICAL PRINTER FOR EXPOSING AN INSTANT FILM

BACKGROUND OF THE INVENTION

1. Field of the Invention

The present invention relates to an optical printer in which an instant film provided with a developer pod is exposed with a fixed exposure head.

2. Description of the Related Art

For example, Japanese Patent Laid-Open Publication Nos. 11-344772 and 11-352595 disclose optical printers in which an exposure head fixed at a predetermined position is driven in synchronism with conveyance of an instant film to print a picture of one frame. In the optical printers described in the above Publications, printing light of each color of R, G and B has a line shape extending in a direction perpendicular to a conveyance direction of the instant film. The printing lights of three colors are simultaneously emitted or are emitted in a line-sequential manner. Meanwhile, by rotating a spreading roller, a developer pod of the instant film is broken to execute a developer-spreading process. In addition, the spreading roller also performs a conveyance process for conveying the instant film.

In such an optical printer, a printing period may be shortened by comparison with a case in that an exposure head is moved for scanning. Further, a space for moving the exposure head is unnecessary so that the optical printer may be downsized.

The optical printers described in the aforesaid Publications employ a rotary encoder in order to measure a conveyance length of the instant film. In virtue of this, the printing light is adapted to be finely adjusted regarding its emission period and its emission intensity. Thus, high-quality printing is performed.

In the above-described optical printer, the spreading roller is driven while printing is performed one line by one line with the exposure head. The developer pod is pressed by the spreading roller to be broken at the beginning of the conveyance of the instant film. A large load is applied to the spreading roller just before breaking the developer pod so that a rotational speed of the spreading roller is suddenly decreased. Right after that, the rotational speed of the spreading roller is suddenly increased. Due to this, a conveyance speed of the instant film is largely changed when the developer pod is broken. The exposure head is required to be driven in synchronism with the conveyance of the instant film. However, when the conveyance speed of the instant film is suddenly increased, it becomes impossible to drive the exposure head in association with the conveyance of the instant film. Thus, there arises a problem in that an unexposed portion is formed to cause a black streak on a printed picture.

The above problem may be solved by improving detection sensitivity of the rotary encoder or by improving an emission changing speed of the printing light and the emission intensity thereof. In another way, the above problem may be solved by starting the exposure after breaking the developer pod. In the former countermeasure, it is required to greatly improve performance of the encoder and the exposure head so that sizes thereof are likely to be enlarged. Further, the cost is likely to be increased.

In the latter countermeasure, it is required that the exposure head and the spreading roller are disposed so as to be adjacent to each other. Consequently, the developer is likely to enter the unexposed surface of the instant film. In order to prevent this, it is considered that the exposure head is slightly moved before starting the conveyance of the instant film. Besides this, it is also considered to reduce a size of a picture to be printed. Doing so, however, causes many disadvantages. In another way, it is considered to decrease the rotational speed of the spreading roller. In this case, however, there is a disadvantage that a printing period is lengthened.

SUMMARY OF THE INVENTION

In view of the foregoing, it is a primary object of the present invention to provide an optical printer in which a conveyance speed of an instant film is prevented from changing at the time of breaking a developer pod.

It is a second object of the present invention to provide an optical printer in which a printing process for obtaining a high-quality print is performed, keeping a shortened printing period.

In order to achieve the above and other objects, the optical printer according to the present invention comprises a braking member for preventing a conveyance speed of the instant film from exceeding a prescribed speed.

The instant film is provided with a developer pod and is conveyed by a pair of spreading rollers. An exposure head is disposed so as to be perpendicular to a conveyance direction of the instant film. The exposure head emits a line-shaped printing light in a sequential manner to expose one frame. A conveyance amount of the instant film conveyed by rotating the spreading roller is detected by a conveyance-amount sensor. A print controller monitors a signal outputted from the conveyance-amount sensor to control the exposure head in synchronism with the conveyance of the instant film.

The braking member applies a load to the rotation of the spreading roller or to the conveyance of the instant film. Owing to this, a rotational speed of the spreading roll is prevented from exceeding a predetermined speed so that the conveyance speed of the instant film is prevented from exceeding the prescribed speed.

In a preferred embodiment, the braking member closely comes into contact with the instant film at an upstream side of the spreading roller. The braking member is preferable to be made of an elastic material of a sponge and so forth. Further, the braking member is preferable to have a roller shape rotated in accordance with the conveyance of the instant film.

According to the optical head of the present invention, it is possible to always detect the conveyance amount of the instant film by providing the braking member, although the conventional conveyance-amount sensor is used. The braking member prevents the conveyance speed of the instant film from suddenly changing due to the rupture of the developer pod. In virtue of this, the printing process by which good image quality is obtained may be executed, keeping the shortened printing period.

BRIEF DESCRIPTION OF THE DRAWINGS

The above objects and advantages of the present invention will become apparent from the following detailed description of the preferred embodiments of the invention when read in conjunction with the accompanying drawings, in which:

FIGS. 7A to 7C are explanatory illustrations showing the developer pod to be broken.

DETAILED DESCRIPTION OF THE PREFERRED EMBODIMENTS(s)

Figure 1:
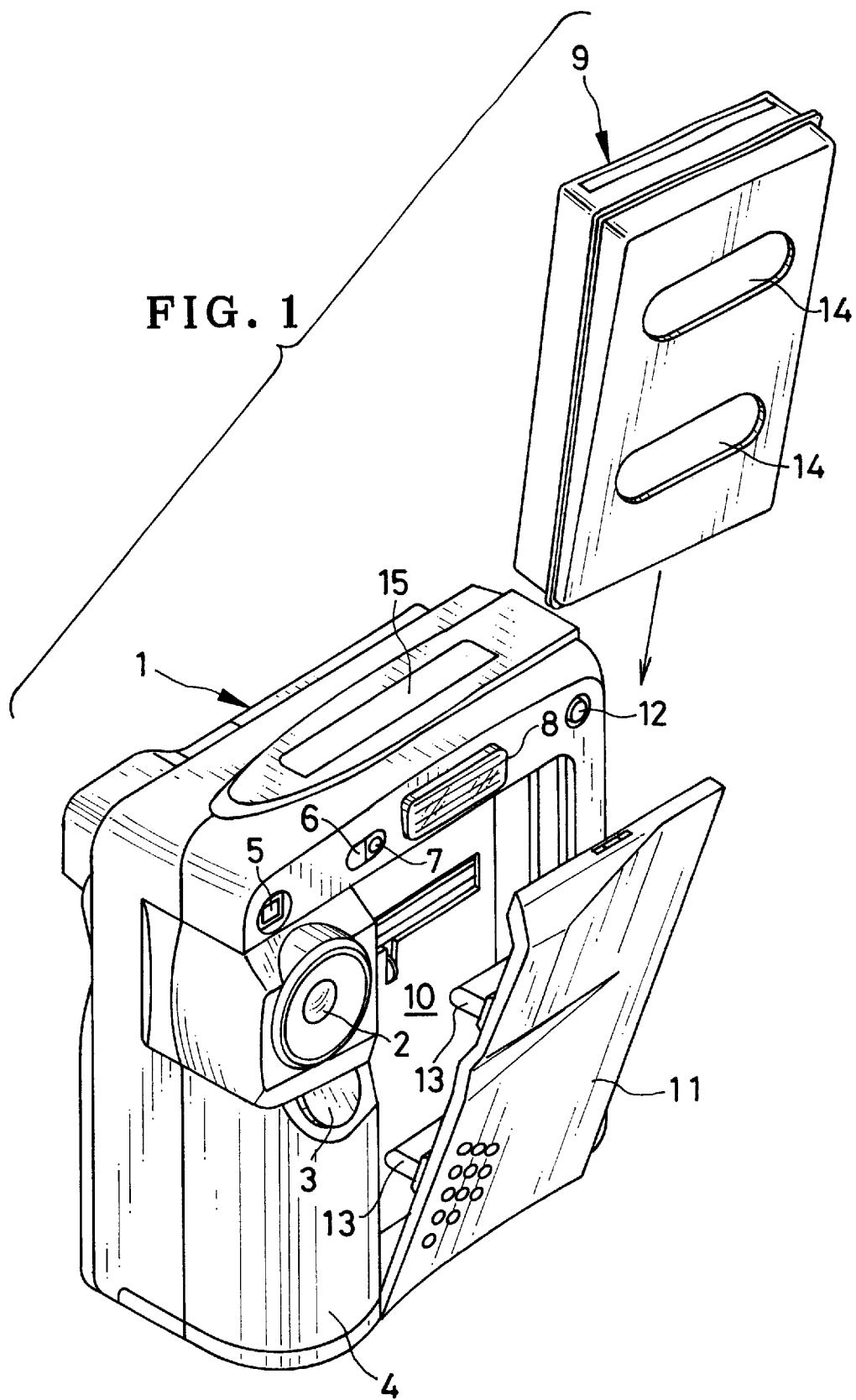
FIG. 1 is a perspective view showing a front side of a digital instant camera according to the present invention.

An optical printer according to the present invention is incorporated into a digital instant camera 1 shown in FIG. 1, together with a photographing mechanism comprising an image sensor. The digital instant camera 1 comprises an imaging unit in which a CCD image sensor is disposed behind a taking lens 2. The digital instant camera 1 is provided with a release button 3 and a grip 4. In addition, the digital instant camera 1 is provided with an optical viewfinder 5, a light-emitting portion 6 used for a self-timer, a sensor 7 for automatic flashing, and a flash emitting window 8, each of which is disposed above the taking lens 2.

A front side of the digital instant camera 1 is provided with a pack chamber 10 and a pack-chamber lid 11. The pack chamber 10 is loaded with a film pack 9. An eject button 12 is provided to open the pack-chamber lid 11.

The film pack 9 is usable for a conventional instant camera as well, and comprises a box-shaped cassette case containing ten instant films of a mono-sheet type. A rear face of the film pack 9 is formed with two openings 14. When the film pack is set to the digital instant camera 1, press members 13 provided inside the pack-chamber lid 11 enter the openings 14 respectively to press the contained instant film from the back side thereof.

An upper face of the digital instant camera 1 is formed with a narrow outlet to discharge the instant film for which an exposure process and a developer-spreading process have been completed. The outlet is shielded by an outlet cover 15 which prevents ambient light, dust and so forth from entering the outlet.

Figure 2:
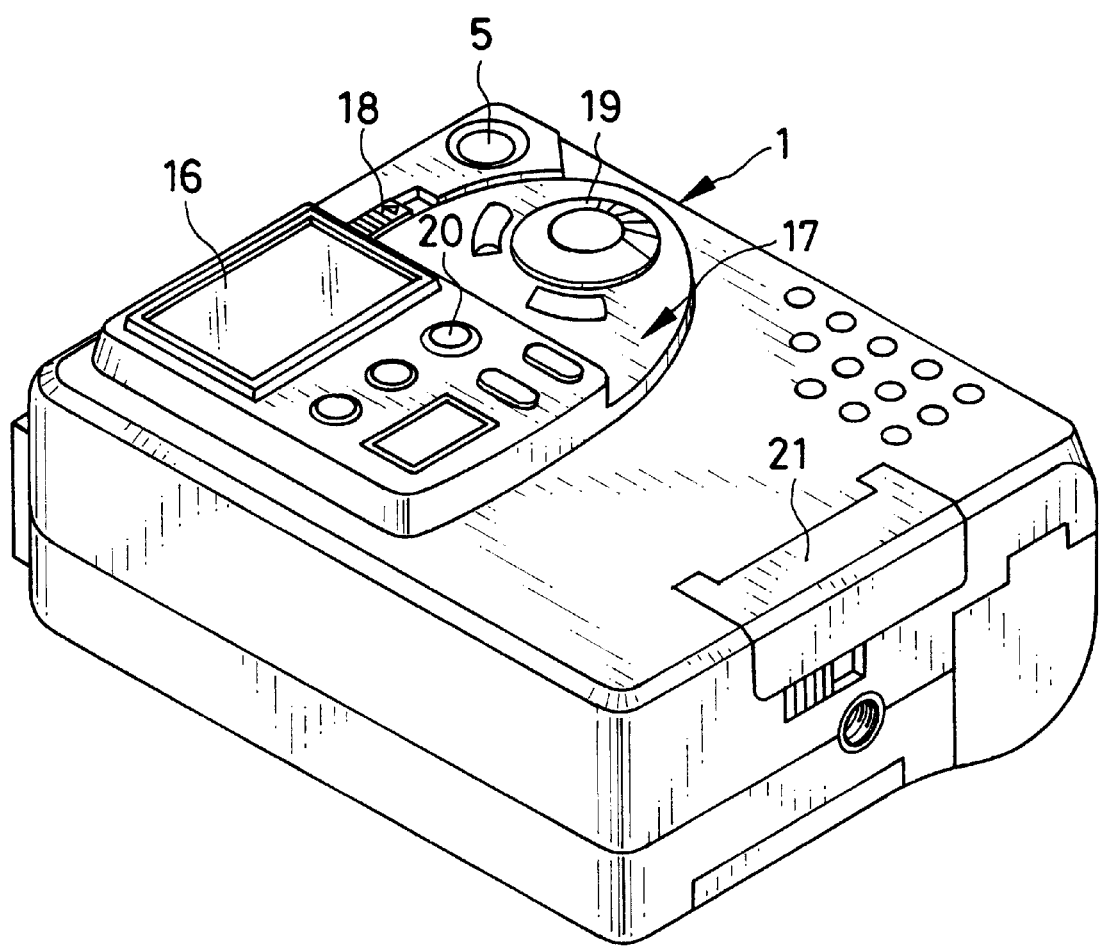
FIG. 2 is a perspective view showing a rear side of the digital instant camera.

FIG. 2 is a perspective view showing a rear side of the digital instant camera 1. An LCD (liquid crystal display) panel 16 is used for displaying, in real time and in full color, a subject image taken by the CCD image sensor. Besides this, the LCD panel 16 is also used for replaying the taken image. On an operation panel 17, is provided a power switch 18, a dial 19, a print button 20 and so forth. The dial 19 is for switching a photograph mode and a reproduction mode. Moreover, a slot cover 21 disposed under the operation panel 17 covers a memory-card slot through which a memory card for storing image data is inserted.

Figure 3:
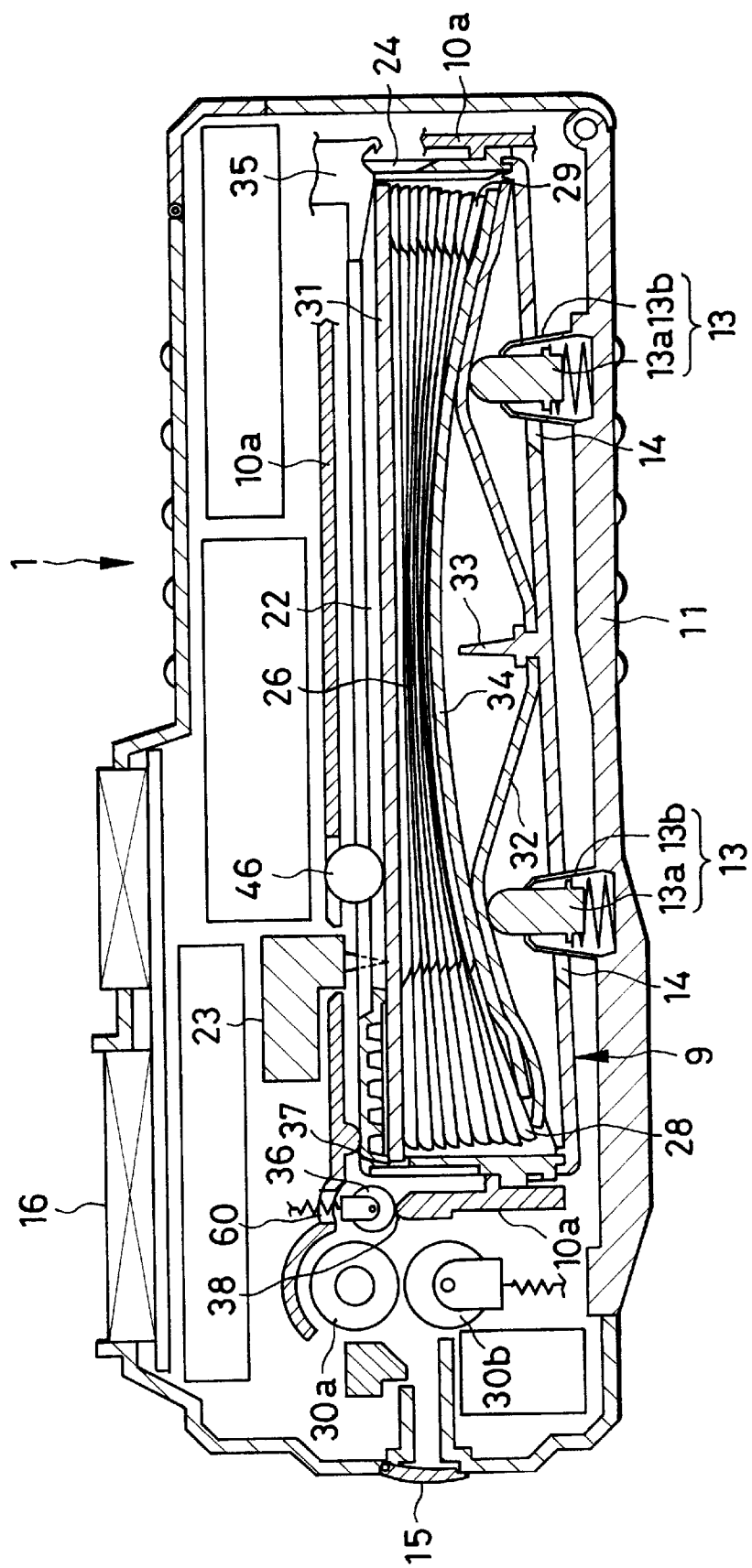
FIG. 3 is a sectional view of the digital instant camera.

FIG. 3 shows a cross section of the digital instant camera 1. The press member 13 enters through the opening 14 formed in the back of the film pack 9. Upon this, a position of the film pack 9 is determined owing to ledges formed on a wall 10a constituting the pack chamber 10. The film pack 9 is positioned such that an exposure aperture 22 formed in the front thereof just faces an exposure head 23.

The exposure head 23 comprises a light-emitting element array and a liquid-crystal dimmer plate, such as described in Japanese Patent Laid-Open Publication No. 11-344772. The light-emitting element array includes three kinds of elements which respectively emit the light of each color of R, G and B, and a large number of which are aligned. The liquid-crystal dimmer plate modulates, every pixel, the light of each color emitted from the light-emitting element array in order to adjust optical density. Further, a micro lens array for making the modulated light converge is provided to obtain a line-shaped printing light.

The film pack 9 contains a plurality of instant films 26, each of which comprises a pod region 28 including developer, and a trap portion 29 including a sponge material. The trap portion 29 absorbs and stiffens the surplus developer after the developer-spreading process. The instant films 26 are stacked such that the pod region 28 is positioned at a side of a spreading roller pair 30. In front of the stacked instant films 26, is prepared a front light-shielding sheet 31 which shields the light passing through the exposure aperture 22 in a non-usage state. Meanwhile, a rear light-shielding sheet 32 is prepared at a rear side of the instant films 26 to shield the light passing through the opening 14. A protect sheet 34 is prepared for preventing the last instant film from being damaged by a projection 33.

The exposure aperture 22 is formed with a cut portion 24 engaging with a claw 35 which is well known and advances the instant film 26 toward the spreading roller pair 30.

The spreading roller pair 30 comprises a driving roller 30a to which a rotational power is applied from a motor, and a driven roller 30b rotated in association with the driving roller 30a. The driven roller 30b is biased with a spring toward the driving roller 30a.

The press member 13 is integrally provided on the pack-chamber lid 11 and comprises a pressing protrusion 13a and a supporting protrusion 13b. The pressing protrusion directly operates on the instant film 26. The supporting protrusion 13b contains a spring for applying a pressure force to the pressing protrusion 13a.

A brake roller 36 is provided near a slit 37 through which the instant film 26 is advanced. The brake roller 36 is lightly urged by a spring 60 and is disposed so as to face a developer blocking member 38 formed on the wall 10a of the pack chamber. The developer blocking member 38 comes into contact with the back of the instant film 26 during the conveyance thereof. Owing to this, the developer is adapted not to flow from a developer pod broken by the spreading roller pair 30 to an area of an exposure surface to which the printing light is not yet applied.

The brake roller 36 is disposed at an upstream side of the spreading roller pair 30 in the conveyance direction of the instant film 26. The brake roller 36 comes into contact with the instant film 26 in a rolling manner during the conveyance of the instant film 26. A surface of the brake roller 36 is coated with a rubber material so as to have elasticity. Owing to this elasticity, the instant film 26 is prevented from being damaged. In addition, the brake roller 36 is adapted not to be idled when contacting with the instant film 26. The brake roller 36 is provided with a press segment 36a described after. In brief, the press segment 36a generates a small frictional force by pressing a rotary shaft of the brake roller 36. The frictional force restrains a rapid change of a rotational speed of the brake roller 36. Incidentally, the brake roller 36 may be disposed near a contact roller 46 on condition that the brake roller 36 is positioned at the upstream side of the spreading roller pair 30. In this case, it is preferable to securely ensure a brake effect by utilizing a reaction force of the press member 13.

Figure 4:
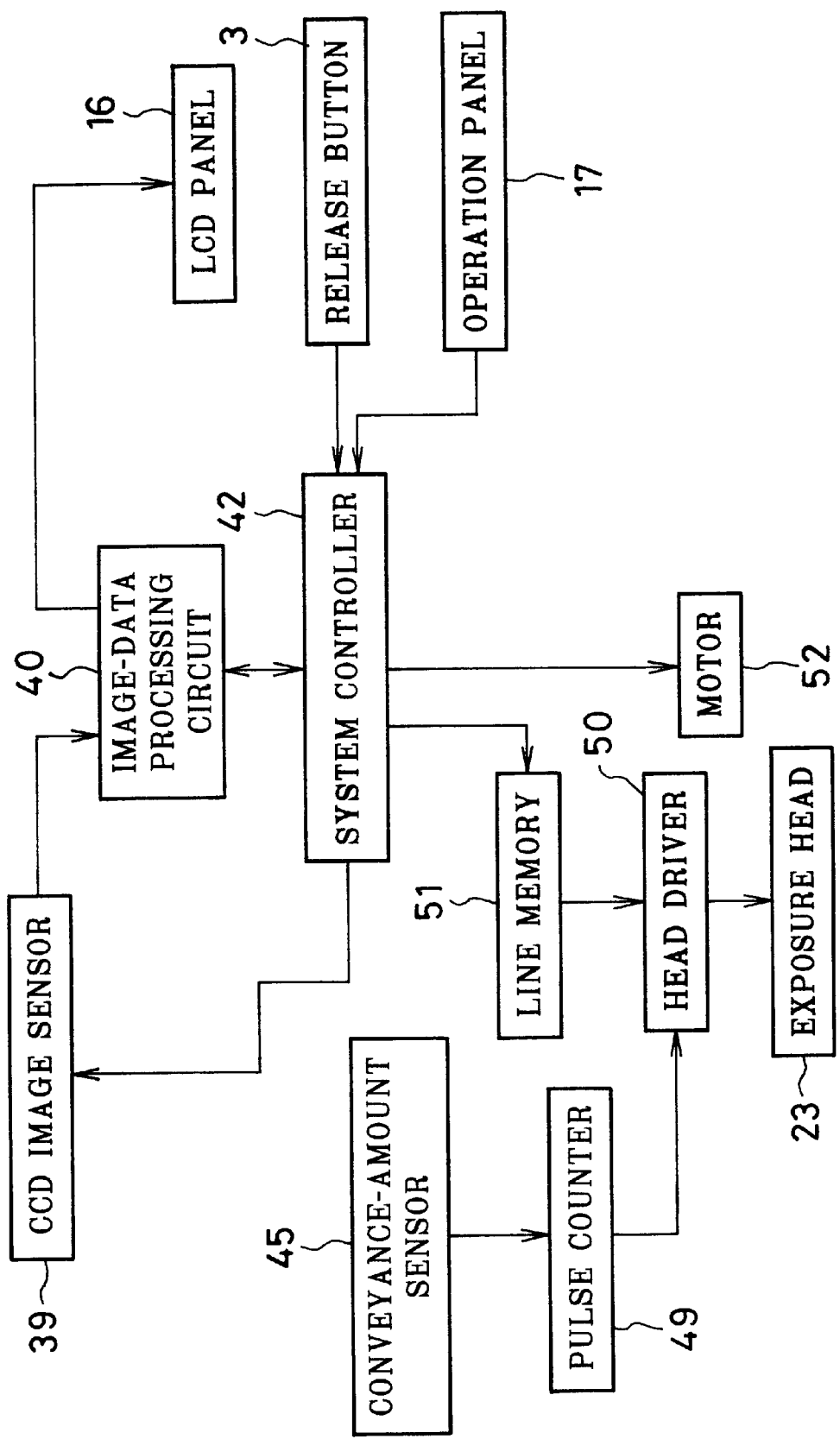
FIG. 4 is a block diagram showing electrical structure of the digital instant camera.

FIG. 4 shows a primary electrical structure of the digital instant camera 1. Light of an subject has passed through the taking lens 2 and is photoelectrically converted by a CCD image sensor 39 to produce an image signal. The produced image signal is digitally converted by an image-data processing circuit 40, and becomes digital image data after a signal processing operation including white balance adjustment, gamma correction, and so forth. Incidentally, the subject image taken by the CCD image sensor 39 is displayed on the LCD panel 16.

A system controller 42 is for totally controlling an electrical operation of the digital instant camera 1. The system controller 42 outputs a drive control signal to each section of the camera in accordance with input signals sent from the release button 3, the operation panel 17, and so forth.

Figure 5:
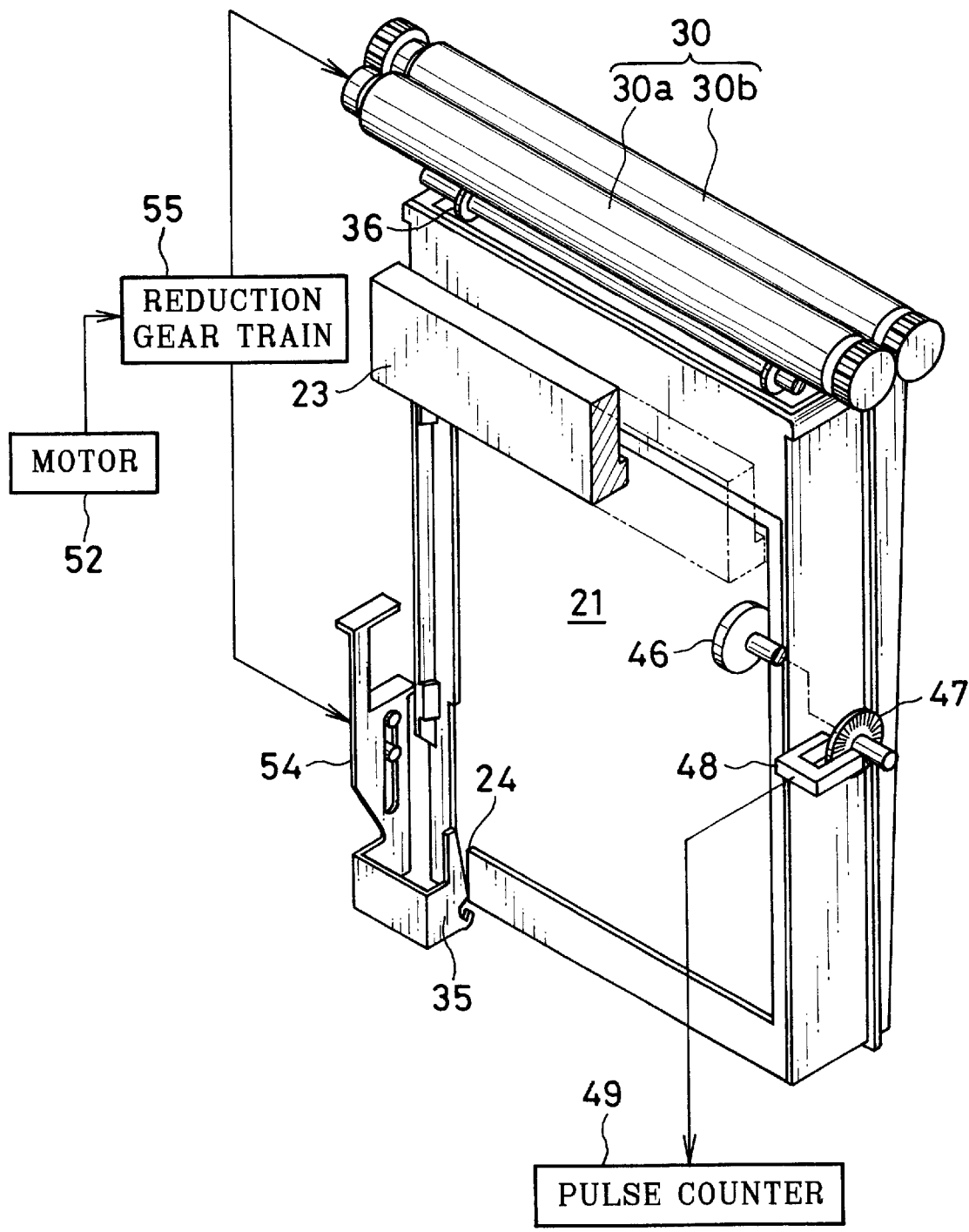
FIG. 5 is an explanatory illustration showing a printer mechanism.

A conveyance-amount sensor 45 is constituted of the contact roller 46, a slit disk 47 and a pulse generator 48, such as shown in FIG. 5. The contact roller 46 comes into contact with the instant film 26 in a rotating manner. From the contact roller 46 to the slit disk 47, a rotational force is transmitted. The pulse generator 48 generates a pulse signal in association with the rotation of the slit disk 47. The conveyance-amount sensor 45 is connected to a pulse counter 49. By the way, the rotation of the contact roller 46 is transmitted to the slit disk 47 after increasing its rotational speed by means of a plurality of gears which are not shown.

The contact roller 46 is disposed near the exposure head 23 to come into contact with the forefront instant film 26 facing the exposure aperture 22 of the film pack 9. When the contact roller 46 is rotated in association with the conveyance of the instant film 26, a plurality of slits radially formed in the slit disk 47 pass the pulse generator 48 to produce the pulse signal. The conveyance-amount sensor 45 generates the pulse signal when the instant film 26 is conveyed by a length corresponding to a half pixel of the printing light. Consequently, it is possible to detect a conveyance amount of the instant film 26 in a substantially continuous manner.

The pulse signal generated by the pulse generator 48 is outputted to the pulse counter 49. The conveyance-amount sensor 45 is constituted as a single unit and the whole thereof is urged by a spring. Even when the contact roller 46 passes a step of the trap portion 29, the conveyance-amount sensor 45 surely works and surely produces the pulse signal in accordance with the conveyance amount.

The pulse counter 49 outputs a head driving signal to a head driver 50 when the pulse signals, number of which is two, are sent from the pulse generator 48, namely when the conveyance amount of the instant film 26 reaches an amount corresponding to one pixel of the printing light. A line memory 51 temporarily stores the image data while the printing process is executed. At the same time, the image data is divided into color constituents of the respective colors. The image data of each color is transferred to the head driver 50 one line by one line.

The head driver 50 turns on the light-emitting element array of three rows of R, G and B. In addition, the head driver 50 drives the liquid-crystal dimmer plate of the exposure head 23 in accordance with the one-line image data of each color transferred from the line memory 51. Thus, the line-shaped printing light whose optical density has been adjusted every color is emitted to the instant film 26. Successively, the head driver 50 drives the liquid-crystal dimmer plate in response to the head driving signal outputted from the pulse counter 49, in order to emit the printing light for the next line. Such operations are repeated on the respective lines. Hence, the exposure head 23 performs the full-color exposure of one frame in a way that the printing light to be emitted is changed by turn in accordance with the conveyance amount of the instant film 26.

The head driver 50 changes the printing light emitted from the exposure head 23 when the conveyance amount of the instant film 26 reaches the amount corresponding to one pixel. For example, when a conveyance speed of the instant film 26 is fast, duration for switching the liquid-crystal dimmer plate is set to be short for the purpose of instantaneously emitting the printing light for the next line. Besides this, light intensity of the light-emitting element array 23 is adapted to be slightly increased. In contrast, when the conveyance speed of the instant film 26 is slow, the duration for switching the liquid-crystal dimmer plate is lengthened so that driving the liquid-crystal dimmer plate is stopped to intercept the light until the light emission for the next line.

For actuating the spreading roller pair 30 and the claw 35, a common motor 52 is used. A driving force of the motor 52 is transmitted via a reduction gear train 55, a structure of which is similar to that of a conventional instant camera described in Japanese Patent Laid-Open Publication No. 4-194832.

Hereinafter, an operation of the present embodiment is described. First of all, the power switch 18 is turned on and the film pack 9 is inserted. The inserted film pack 9 is detected in the camera. Then, the front light-shielding sheet 31 is automatically discharged to make a printable condition. Successively, the dial 19 is operated to select one of the photograph mode and the reproduction mode. Under the photograph mode, the subject image formed on the CCD image sensor 39 is displayed on the LCD panel 16. When the release button 3 is depressed after framing, the image data of the current subject is produced. Meanwhile, under the reproduction mode, it is possible to display the image data stored in the memory card.

Under the photograph mode, the taken image is displayed on the LCD panel 16. At this time, it is possible to select whether or not the printing process is executed for the displayed image. Under the reproduction mode, any image to be printed is read out of the memory card. In both cases, the printing process for the image is started in response to an operation of the print button 20.

When the printing process is started, the image data is transferred to the line memory 51, and the motor 52 is started to be driven. The motor 52 drives the spreading roller pair 30 and the claw 35 so that the advancement of the instant film 26 is started thereby. Owing to this, the contact roller 46 is rotated so that counting the pulse signal is started in the pulse counter 49. Right after the commencement of the printing, the pulse counter 49 waits to output the head driving signal until the exposure face of the instant film 26 reaches a position where the printing light of the exposure head 23 is applied. A period for waiting is determined beforehand in the pulse counter 49.

When a top end of the pod region 28 of the instant film 26 comes to the spreading roller pair 30 after passing through a space between the brake roller 36 and the developer blocking member 38, the exposure face of the instant film 26 comes to the printing-light applied position. Then, the head driving signal is started to be sent from the pulse counter 49 to the head driver 50. Moreover, a process for breaking the developer pod is started by the spreading roller pair 30.

Figure 6:
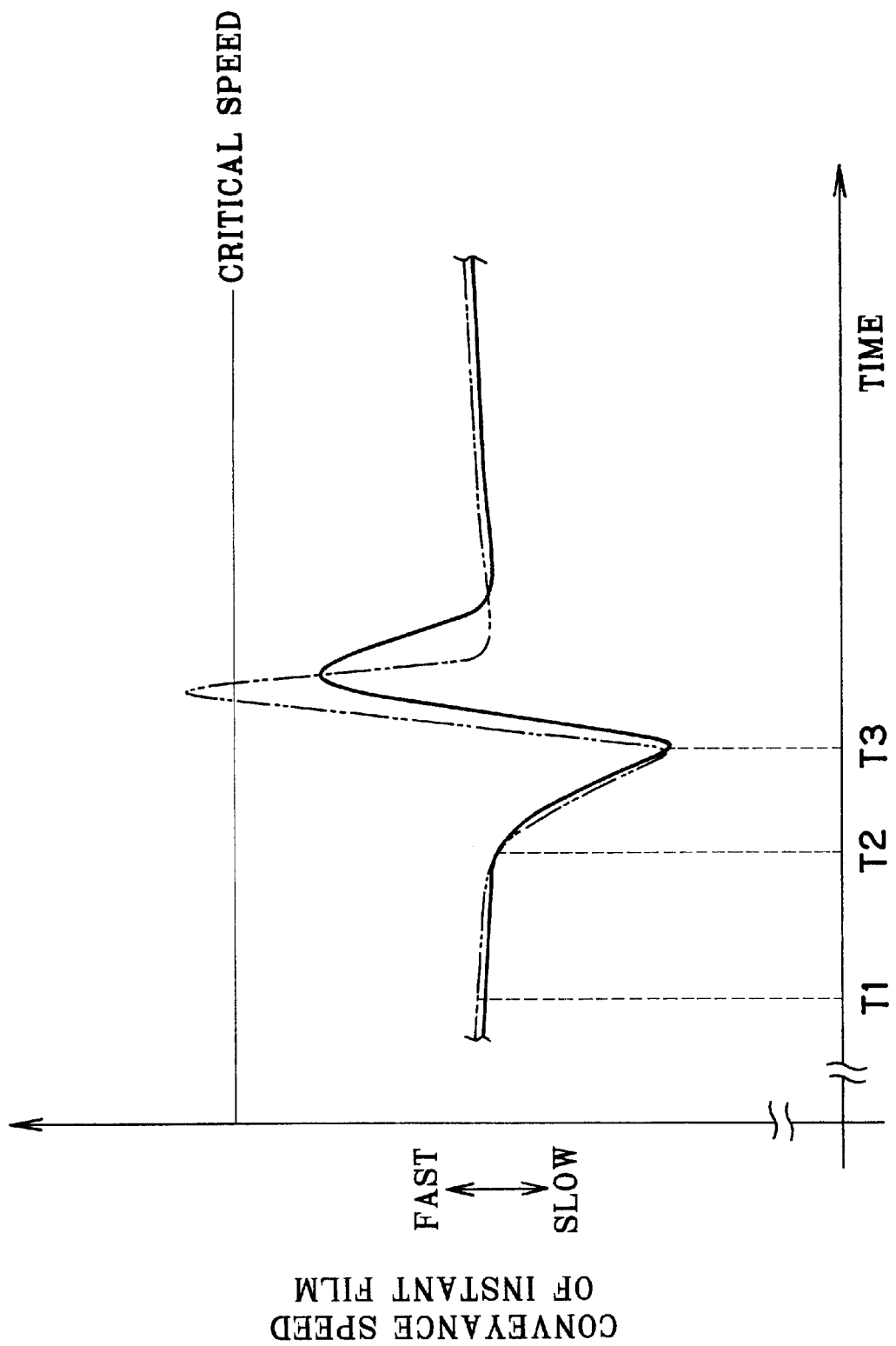
FIG. 6 is a graph showing a change of a conveyance speed of an instant film at the time of breaking a developer pod.

FIG. 6 shows a change of the conveyance speed of the instant film 26 at the time of breaking the developer pod. In FIG. 6, a measurement result of the present embodiment is represented by a solid line, and a two-dotted line represents a measurement result of another case in that the brake roller 36 is not provided for the purpose of comparison.

An abscissa of FIG. 6 represents the passage of time. At the time T1, the developer pod 56 is started to be broken, such as also shown in FIG. 7A. Developer 57 is gathered inside the developer pod 56 at the beginning of the breaking process. However, load applied to the spreading roller pair 30 at this time is not so great that the conveyance speed of the instant film is hardly slowed. At the time T2, the developer 57 gathered by the spreading roller pair 30 starts to break the developer pod 56 such as shown in FIG. 7B. At this point, great load is applied to the spreading roller pair 30 so that rotation thereof is disturbed. Due to this, a rotational speed of the spreading roller pair 30 is vastly slowed. Thus, the conveyance speed of the instant film is also slowed.

The rotational speed of the spreading roller pair 30 and the conveyance speed of the instant film 26 become a minimum at the time T3. At this point, the load applied to the spreading roller pair 30 becomes the maximum. Right after this point, the developer pod 56 is broken and the developer 57 runs out, such as shown in FIG. 7C. The load applied to the spreading roller pair 30 until then is suddenly disburdened so that the rotational speed of the spreading roller pair 30 is suddenly increased just after the time T3.

If the brake roller 36 is not provided, the instant film 26 is rapidly moved due to great acceleration of the spreading roller pair 30. In this case, it is impossible to properly output the head driving signal from the pulse counter 49. Further, it is also impossible to properly control the liquid-crystal dimmer plate with the head driver 50. Ultimately, it becomes impossible to properly switch the emission of the printing light. FIG. 6 shows a critical speed of the conveyance speed of the instant film. In case the conveyance speed exceeds the critical speed, it is impossible to emit the printing light.

By contrast, the brake roller 36 is provided in the present embodiment. When the rotational speed of the spreading roller pair is suddenly increased, the press segment 36a of the brake roller 36 generates the aforesaid frictional force on the rotary shaft thereof. The generated frictional force works so as to pull the instant film 26 backward relative to the conveyance direction. In virtue of this, the great acceleration of the spreading roller pair 30 is braked. The great acceleration of the spreading roller pair 30 is caused due to a low-torque rotation when the load is released by the rupture of the developer pod 56. Notwithstanding, the conveyance speed of the instant film 26 is kept at the critical speed or less by the break roller 36.

By providing the break roller 36, it becomes possible to surely emit the printing light in association with the conveyance of the instant film 26. The spreading roller pair 30 executes, after passing the developer pod 56, a process for spreading the developer 57 on the exposure face to which the printing light has been applied. After emitting the printing light with the exposure head 23 and after executing the spreading process of the developer with the spreading roller pair 30, the instant film 26 is discharged, pushing up the outlet cover 15.

When the development of the image and the fixation thereof are completed after a few minutes, a positive image appears on the instant film 26. This positive image being as a photo print has good image quality without black streaks.

The present invention is not exclusive to the above embodiment. For example, the brake roller 36 may be contact with the spreading roller pair 30 instead of the instant film 26. Moreover, without using the brake roller 36, the gears of the reduction gear train 55 may be driven in a slightly heavy manner to restrain the great acceleration of the spreading roller pair 30.

The shape of the braking member is not exclusive to the roller shape rotating such as the brake roller 36. For example, the frictional force may be generated by pressing an elastic member of a sponge material and so forth against the instant film 26 and the spreading roller pair 30. In this case, it is preferable to contact the sponge material with the instant film 26 from an opposite side of the exposure face in order to prevent the exposure face from being damaged.

Moreover, the braking member coming into contact with the instant film may generate the frictional force by contacting with a white margin portion formed around the exposure face of the instant film 26. Furthermore, the frictional force may be generated by catching an edge of the instant film from its both sides.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An optical printer for performing exposure with an exposure head while an instant film provided with a developer pod is conveyed by a pair of spreading rollers, said exposure head being disposed so as to be substantially perpendicular to a conveyance direction of said instant film, and said exposure head emitting a line-shaped printing light to said instant film in a sequential manner during the conveyance of said instant film, said optical printer comprising:

a conveyance-amount sensor for detecting a conveyance amount of said instant film conveyed by rotating said spreading roller;

print control means for monitoring a signal outputted from said conveyance-amount sensor and for controlling a drive of said exposure head in synchronism with a movement of said instant film; and braking means for applying a load to one of the rotation of said spreading roll and the conveyance of said instant film, said braking means restraining a conveyance speed of said instant film so as to be a predetermined speed or less.

2. An optical printer according to claim 1, wherein said braking means is a brake roller closely coming into contact with said instant film, said brake roller being disposed at an upstream side of said spreading roller in said conveyance direction of said instant film.

3. An optical printer according to claim 2, wherein said brake roller is provided with a press segment pressing a rotary shaft of said brake roller to apply a frictional force to said rotary shaft, and the load is applied to the conveyance of said instant film by said frictional force.

4. An optical printer according to claim 3, wherein said brake roller is disposed at a downstream side of said exposure head in said conveyance direction of said instant film.

5. An optical printer according to claim 3, further comprising:

a developer blocking member for preventing a developer of said developer pod from flowing to an unexposed surface of said instant film, said developer blocking member being disposed so as to face said brake roller.

6. An optical printer according to claim 5, wherein said brake roller comes into contact with an exposure surface of said instant film, and said developer blocking member comes into contact with a rear face of said instant film.

7. An optical printer according to claim 6, wherein said brake roller is urged toward said developer blocking member by a spring.

8. An optical printer according to claim 7, wherein a circumferential surface of said brake roller is coated with a rubber material to prevent said instant film from being damaged.

9. An optical printer according to claim 2, wherein said conveyance-amount sensor comprises:
- a contact roller coming into contact with said instant film and rotating in association with the conveyance thereof;
- a slit disk to which a rotation of said contact roller is transmitted, said slit disk being formed with a plurality of slits; and
- a pulse generator for optically detecting said slit to output a pulse signal during the rotation of said slit disk.

10. The optical printer as recited in claim 1, wherein said braking means apply a load to the rotation of said spreading roll.

11. The optical printer as recited in claim 1, wherein said braking means apply a load to the conveyance of said instant film.

12. The optical printer as recited in claim 1, wherein said braking means restraining a conveyance speed of said instant film so as to be a predetermined speed or less after said developer is broken by said spreading roll.

* * * * *